(12) United States Patent
Luk et al.

(10) Patent No.: US 7,797,348 B2
(45) Date of Patent: Sep. 14, 2010

(54) DATA STRUCTURE AND SYSTEM FOR IP ADDRESS LOOKUP AND IP ADDRESS LOOKUP SYSTEM

(75) Inventors: Robert Wing Pong Luk, Hong Kong (HK); Wai Tak Wong, Hong Kong (HK)

(73) Assignee: The Hong Kong Polytechnic University, Hong Kong (CN)

( * ) Notice: Subject to any disclaimer, the term of this patent is extended or adjusted under 35 U.S.C. 154(b) by 694 days.

(21) Appl. No.: 10/836,577

(22) Filed: Apr. 30, 2004

(65) Prior Publication Data

US 2004/0267732 A1    Dec. 30, 2004

Related U.S. Application Data

(60) Provisional application No. 60/467,223, filed on May 1, 2003.

(51) Int. Cl.
G06F 17/30    (2006.01)

(52) U.S. Cl. ..................................................... 707/802

(58) Field of Classification Search ................. 707/100, 707/8; 370/401, 392
See application file for complete search history.

(56) References Cited

U.S. PATENT DOCUMENTS

| | | | |
|---|---|---|---|
| 5,745,600 A | 4/1998 | Chen et al. | 382/218 |
| 6,263,333 B1 | 7/2001 | Houchin et al. | 707/5 |
| 6,590,898 B1 * | 7/2003 | Uzun | 370/401 |
| 6,859,455 B1 * | 2/2005 | Yazdani et al. | 370/392 |
| 7,103,597 B2 * | 9/2006 | McGoveran | 707/8 |
| 2002/0156551 A1 | 10/2002 | Tackett et al. | 700/245 |

OTHER PUBLICATIONS

Larsson, N. Jesper "Structure of String Matching and Data Compression," Department of Computer Science Lund University, Copyright 1999.
Miguel A. Ruiz-Sanchez et al. "Survey and Taxonomy of IP Address Lookup Algorithms," IEEE Network, Mar./Apr. 2001.
Pinar Altin Yilmaz et al. "A Trie-Based Algorithm for IP Lookup Problem," New Jersey Institute of Technology, Copyright 2000.

* cited by examiner

*Primary Examiner*—Don Wong
*Assistant Examiner*—Sheree N Brown
(74) *Attorney, Agent, or Firm*—Schwabe, Williamson & Wyatt, P.C.

(57) ABSTRACT

A tree data structure for storing strings of searchable data divided into substrings has at least one first type node that has a substring associated with it and at least one second type node that does not having a substring associated with it. A second type node is directly linked to a first type node by a fail transition. A first type node is directly linked to a second type node by a match transition. An IP address lookup system has memory for storing a tree data structure and a controller for storing and loading an incoming IP address. The system has a finite state machine having three stages including a first stage for loading the IP address and performing a length calculation, a second stage for searching the data structure to find a match, and a third stage for determine the next-hop address index.

12 Claims, 7 Drawing Sheets

(a)

(b)

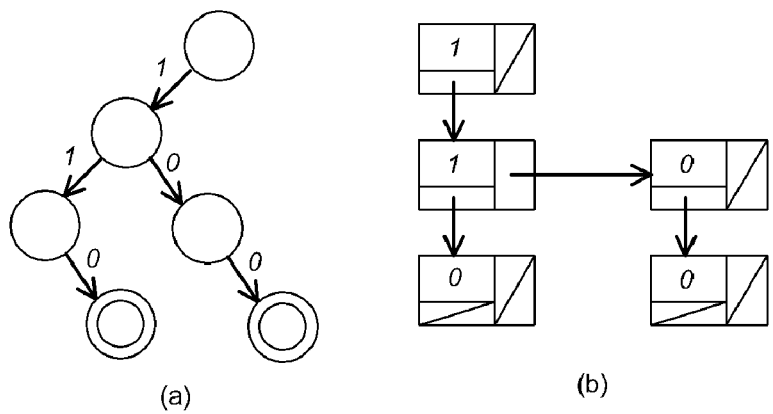
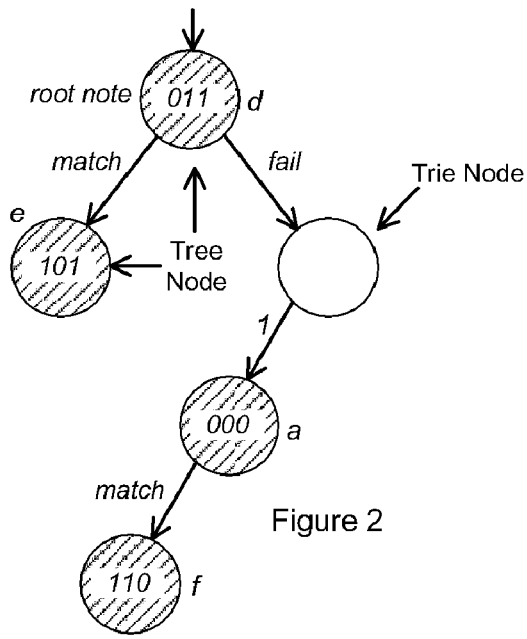
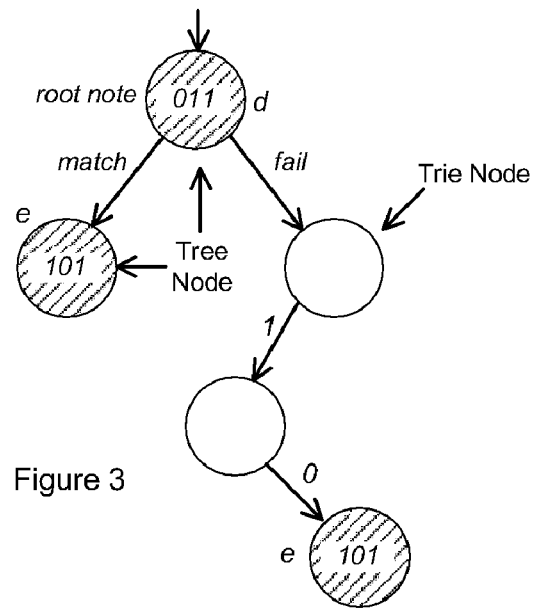
Figure 1
Figure 2
Figure 3

| State $S_t$ | Step $S_{t+1}$ | Action | |
|---|---|---|---|
| 0 | 0 | - | Reset - update begins |
| 0 | 1 | 1-4 | Start Searching (Algorithm B) Appropriate Initialization |
| 1 | 1 | 4 | Wait for search to halt (Figure 10) |
| 1 | 3 | 6-9 | If IP Finish or ExactEnd then<br>    If IPFinish then PrefixPtr ← hop register<br>    elseif ExactEnd then Hop ← hop register |
| 1 | 2 | 10-16 | If RAMAdr = 0 then root ← NewNodeAdr<br>Elseif PrefixPtr = NULL then<br>    PrefixPtr ← NewNodeAdr<br>Elseif P[i] = 0 then<br>    ZeroPtr ← NewNodeAdr<br>    i ← i + 1;<br>Elseif P[i] = 1 then<br>    OnePtr ← NewNodeAdr<br>    i ← i + 1;<br>RAMAdr ← NewNodeAdr |
| 2 | 2 | 17-22 | If not IPFinish then<br>    StrideChar ← {0, IP[i..i+k]};<br>    Len ← k;<br>    Hop ← hop register<br>    PrefixPtr ← NewAdr;<br>    RAMAdr ← NewAdr;<br>    NewAdr ← NewAdr + 1; |
| 2 | 3 | 23-25 | If IPFinish then<br>    StrideChar ← {1, IP[i..i+k]};<br>    Len ← i + k - |P|;<br>    Hop ← hop register |
| 3 | 3 | | End |

Table 1

| State $S_t$ | Step $S_{t+1}$ | Action | |
|---|---|---|---|
| 0 | 0 | - | Reset delete |
| 0 | 1 | 1-4 | Start Searching (Algorithm B) Appropriate Initialization |
| 1 | 1 | 4 | Wait for search to halt (Figure 10) Maintain previous hop (phop) and stack |
| 1 | 3 | | If IP not Finish and not ExactEnd then Goto state 3 and Halt |
| 1 | 3 | 9 | If (IP Finish or ExactEnd) and not leave node then Hop ← phop |
| 1 | 2 | 10 | If (IP Finish or ExactEnd) and leave node then Hop ← phop |
| 2 | 2 | 11-13 | If RAMAdr ≠ 0 and ZeroPtr ≠ 0 and OnePtr ≠ 0 and Hop = hopregister then OldReg ← RAMAdr; FreeNode(RAMAdr); RAMAdr ← TopOfStack; TopOfStack ← TopOfStack - 1; |
| 2 | 3 | 14-19 | Else If ZeroPtr = OldReg then RAMAdr.ZeroPtr ← 0; Else If OnePtr = OldReg then RAMAdr.OnePtr ← 0; Else If PrefixPtr = OldReg then RAMAdr.PrefixPtr ← 0; |
| 3 | 3 | | Halt |

Table 2

DATA STRUCTURE AND SYSTEM FOR IP ADDRESS LOOKUP AND IP ADDRESS LOOKUP SYSTEM

This application claims priority from and incorporates by reference U.S. Provisional Patent Application Ser. No. 60/467,223, filed May 1, 2003.

BACKGROUND TO THE INVENTION

1. Field of the Invention

The current invention relates to data structures from use in IP address lookup systems and to IP address lookup systems 2. Background Information In IP forwarding a lookup is needed for every data packet received by the router. The router uses the lookup to identify a next-hop address and exit port in a routing table. IP forwarding speed is becoming a major problem with increasing demand on the Internet due to multiple protocols converge, faster and more affordable data links, increased traffic due to more users and novel applications such as SMS and multimedia. The problem is further compounded by the use of the classless inter-domain routing (CIDR) address assignment scheme, and the introduction of IP version 6, in which IP addresses can be as long as 128 bits.

To reduce the demanding requirements of fast IP lookup it has been suggested that additional information such as tags and labels be added to the new version of the IP protocol. The additional information is intended to improve the forwarding rate and to simplify the forwarding process. The wide deployment of these schemes still needs to be tested and backward compatibility with IP version 6 would still demand high performance forwarding machines. Other efforts to reduce the demand requirements of fast IP address lookup include reducing the size of routing tables, since smaller routing tables can enhance lookup speed, and the use of caches.

SUMMARY OF THE INVENTION

It is an object of the present invention to provide a data structure and system for IP address lookup which overcomes or ameliorates the above mentioned disadvantages.

According to a first aspect of the invention there is provided a tree data structure for storing two or more strings of searchable data, said strings being divided into a plurality of substrings, said data structure comprising a plurality of data keys each holding a substring, a plurality of nodes including at least one first type node having a substring associated with it and at least one second type node not having a substring associated with it, a plurality of transitions including at least one fail transition, and wherein the second type node is directly linked to the first type node by the fail transition.

According to a second aspect of the invention there is provided a method of searching a tree structure having at least two levels for storing two or more strings of searchable data, the strings being divided into a plurality of substrings, the data structure comprising at least one first level node having a first field for storing a substring, at least three second level nodes and at least three transitions including a match transition, a first fail transition and a second fail transition, wherein the second level nodes are directly linked to the first level node by the three transitions, said method including comparing the key to the substring and when a match is found transitioning the match transition to the second level of the tree, and when a match is not found comparing a character of the key with the first and second fail transitions and when the character matches the first fail transition transitioning the first fail transition to the next level of the tree and when the character matches the second fail transition transitioning the second transition to the next level of the tree.

According to a third aspect of the invention there is provided an IP address lookup system comprising memory for storing a searchable data structure relating an IP address to a next-hop address, a controller for storing and loading an IP address, a finite state machine having three stages including a first stage for loading the IP address and performing a length calculation, a second stage for searching the data structure to find a match, and a third stage for determine the next-hop address index, and a buffer to hold the next hop address index.

Further aspects of the invention will become apparent from the following description which is given by way of example only.

BRIEF DESCRIPTION OF THE DRAWINGS

The invention will now be described with reference to the accompanying drawings in which:

FIG. 1 illustrates a Trie and its corresponding child-sibling representation of the IP addresses 110 and 100, FIG. 2 is a Binary hybrid search tree for the IP addresses 110 and 100, FIG. 3 is a Hybrid search tree for the IP addresses 110 and 100.

DESCRIPTION OF THE PREFERRED EXAMPLE

Figure 4:
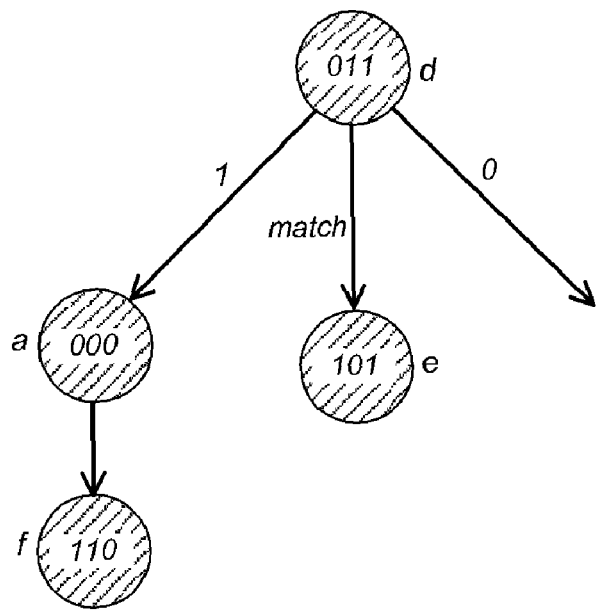
FIG. 4 is a ternary hybrid search tree for the IP addresses 110 and 100.

AN IP forwarding system comprises a customized SRAM circuit design for IP forwarding. The search function is implemented as a finite state machine (FSM) with less than 10 states and the insertion function is carried out using less than 20 states.

Simple uniform data structures are used that add little logic circuitry to the standard SRAM circuits. This allows easy verification, fast design turn around time and customization to both static and dynamic router requirements. Before the hardware design is described the data types and data structures used are discussed.

String Abstract Data Type

Applicants earlier U.S. patent application Ser. No. 10/112,043, the contents of which are considered included herein, discloses an abstract data type called spstring that can represent a trie in a storage efficient manner. Spstring is a string over an infinite tuple alphabet $\Delta=((\Sigma\cup\{\#\})\times Z)\cup\{\epsilon\}$, where $\Sigma$ is a finite alphabet, # is a special character outside $\Sigma$, $\epsilon$ is the null character and Z is the set of integers. A character in $\Delta$ is represented as a tuple (a, p) where a is a character in $\Sigma\cup\{\#\}$ and p is called the skip pointer. A trie is linearized into a string (Spstring) s with skip pointers augmented at relevant positions in s to skip certain part of the sub-string in s during search and insertion of keywords.

IP addresses can be represented in the string. An IP address, say 110, is copied to an empty string s resulting in: s=(1,0).(1,0).(0,0).(#,0) where the second value in each group is the skip pointer. If the value of the skip pointer is zero, the skip pointer is omitted. In this case, s=110#. To insert a second IP address, say 100, in to s, searching is carried out between s and the second IP address. The search starts at the beginning of s and matches the first character 1. However, the second character of s and that of the IP address do not match. Since a mismatch is found, the remainder of the IP address (i.e. 00) is appended to s and the skip pointer at the mismatch position (i.e. 2) is updated with the original length of s. Hence, the updated spstring s becomes: s=1.(1,5).0#00#, where 5 is the value of the skip pointer.

A trie representation of s is shown in FIG. 1. The spstring corresponds to the child-sibling representation of the trie, where the child pointers are erased and the skip pointers are the sibling pointers. The number of non-zero sibling pointers is equal to the number of IP addresses represented by the trie minus one. This represents a significant saving in storage if all skip pointers with zero values are erased. No intermediate node in the trie is associated with a character in s. The characters in s are associated with transitions between nodes. The # character, that separates unmatched IP address suffixes in the spstring, corresponds to special trie nodes and leaf nodes, represented by the double circle, where the prefix to that trie node represents a complete IP address.

Alphabet Coding

In prefix expansion, multiple bits are packed as an entity or a character for fast processing. For example, if 2 bits are packed as a character then the equivalent alphabet size is 4. The number of packed bits is called the stride k.

Prefix expansion is undesirable because of the need to expand prefixes to the integral powers of the stride. Instead of expanding the prefixes, a one bit prefix is added to each bit string to indicate whether the end of the IP address is reached. If this prefix bit is 0, then all the bits in the string represent the packed bits of the IP address. Otherwise, the end of the string, or IP address, is reached and number of packed bits is less than the stride. In this case, where the number of packed bit is less than the stride, it is necessary to know the number of bits packed, as well as the bit pattern. One encoding that can serve both purposes is to use a 10* suffix appended to the packed bits, where 0* means zero or more zero-value digits such that the total length is equal to the stride. If the prefix bit is not 0 then to detect the length, the bits are scanned backward until 1 is found and the rest of the bit patterns are the packed bits. Alternatively, the suffix coding could use 01* suffix, where 1* means non-zero or more non-zero value digits such that the total length is equal to the stride. We call this stride+1 coding because it includes the stride bits plus a one bit prefix.

Let p be a bit string of length stride plus 1 (i.e. k+1). The first character in p is the delimiter bit (i.e. p[1]). If p[1]=0, then p[2 . . . k+1] are the k packed bits. If p[1]=1 and the number of packed bits is n, which is less than k, then p[2 . . . n+1] are the n packed bits, p[n+2]←1 and p[n+3 . . . k+1]←0 (if n+2<k). The two IP addresses 110 and 100 packed using stride+1 coding are (0<u>11</u>) (1<u>0</u>1) and (1<u>0</u>)(1<u>0</u>1) respectively, where the string between brackets is a stride+1 character. The first bit is the prefix, 0 or 1, indicating whether the all the bits in the string represent the packed bits of the IP address and the underlined bits are the packed bits.

Hybrid Search Tree

Spstring and alphabet coding can be used together to represent any trie. For example, the two IP addresses 110 and 100 can be represented by the following spstring: s=(d, 3).e.c.e; where $\Sigma_2$={a, b, c, d, e, f}, a=000, b=001, c=010, d=011, e=101, f=110.

For spstring with stride+1 coding, there is no need for the # character since the prefix bit is used to indicate the end of the IP address. A disadvantage of using stride+1 coding with Spstring is that the number of traversals is increased substantially. In the worst case, all positions that are directly pointed to by the skip pointer or pointed to via any number of indirection of a sequence of skip pointers have to be visited, which is not desirable.

To overcome this problem an alternating hybrid search tree is used. Under some conditions the search tree takes advantage of the stride+1 coding and in other conditions the search tree is like a conventional trie for efficiently finding the longest prefix match. A simple hybrid search tree is a binary search tree. When stride+1 coding is used, the tree node tests whether the incoming IP address prefix is the same as the stride+1 character stored in the tree node. If not, the failure branch of that tree node is traversed and matching reverts to conventional trie searching for the following trie node. If the match is successful, the success branch is traversed, arriving at another tree node. The root node is always a tree node since a trie node is visited only after a failure to match in the parent tree node.

FIG. 2 shows the binary hybrid search tree for the two IP addresses 110 and 100 using the alphabet $\Sigma_2$. Since this hybrid search tree is a tree it can be represented as a spstring s=(d, 3).e.1.a.f, where the skip pointer represents the fail branch of a tree node or the sibling pointer of a trie node.

For the best case, the number of traversal for a successful search is reduced to |P|/k where P is the keyword and k is the stride. For the worst case, since each tree node leads to a match failure and the trie node always results in a successful match, the number of traversals for a successful search is 2|P|+1. For the spstring representation each trie node requires at most 2 additional skip pointers therefore the worst case search time is 3|P|+1 traversals. If the number of additional traversal due to match failure can be reduced, then the worst-case search time can be reduced further.

With the hybrid search tree an additional traversal occurs for every failure to match in the tree node. One special consideration is that after each failure to match in the tree node, a sub-trie of maximum depth r equals to the stride k follows. Based on the example in FIG. 2, the hybrid search tree is shown in FIG. 3. For this example, after the failure to match at the root node, there are two trie nodes because the maximum depth r=2=k. When the maximum depth is reached, the search reverted back to the tree node with character e. For the worst-case search time with r=k, this case, there are at most ⌈|P|/k⌉ additional traversals and there are |P| binary trie traversals. In general, the worst-case number of traversal is bounded by:

$$T(r) = \frac{|P|}{r} + |P| + 2.$$

As r tends to infinity, the worst-case search time approaches that of the standard binary trie. However, if r is set arbitrary large, then the number of tree node is reduced and the reduction in storage by packing multiple bits together is also reduced.

A tree node has the following structure:

```
Struct BTreeNode begin
    Character StrideChar;
    Integer hop; {Nexthop adr idx}
    Integer len; {Len of StrideChar}
    Pointer LeftPtr;
    Pointer RightPtr;
End
```

The following Algorithm is the search procedure for a binary hybrid search tree of arbitrary depth r.

```
Method: Search_BHT
Input: string P, integer k, integer r
Output: stack t, integer h, integer w
 1:   integer i ← 0; {Initialize}
 2:   integer hop ← 0;
 3:   integer len ← 0;
 4:   integer rlen ← 0;
 5:   BTreeNode c ← root;
 6:   stack o ← NULL;
 7:   Bool tree ← true;
 8:   while c ≠ NULL do {Loop}
 9:       push(c, o); {for delete only}
10:       if tree then {tree node}
11:           if c.StrideChar = P[i..i+k−1] then
12:               i ← i + c.len;
13:               len ← c.len;
14:               hop ← c.hop;
15:               if len<k then return (o, hop, 0);
16:               else c ← c.LeftPtr;
17:           else {match fail: goto trie node}
18:               c ← c.RightPtr;
19:               tree ← false;
20:               rlen ← 0;
21:       else {trie node}
22:           rlen ← rlen + 1;
23:           if rlen = r then tree ← true;
24:           if P[i] = 0 then
25:               i ← i + 1;
26:               hop ← c.hop;
27:               c ← c.RightPtr;
28:           if P[i] = 1 then
29:               i ← i + 1;
30:               hop ← c.hop;
31:               c ← c.LeftPtr;
32:           else return (o, hop, 0);
33:   return (o, hop, i);
```

A trie node is a TreeNode with a NULL character for StrideChar. The stack o (Step 6) is used to keep track of the traversed nodes for the delete operation only and is not used for searching or insertion. If the current node is a tree node (Step 10) and the stride+1 character is matched, then Steps 12-14 update the relevant variables. Step 13 decides whether the search reaches the end. If not, the search continues. If the tree node failed to match, then traversal is made to a trie node (Step 17). The variable rlen is used to keep track of the depth or the number of traversals from the root of the sub-trie. Once the depth reaches the given maximum depth r, the next traversed node is assumed to be a tree node (Step 23).

The number of failure to match at tree nodes should be at most N−1, where N is the number of IP addresses in the database. For each match failure the number of trie nodes is at most r and the number of trie nodes are at most (N−1) r. The number of tree nodes are at most (T−N)/k+N−1 since each tree node represents k original trie nodes and the number of trie nodes is T. Hence, the total number of nodes is bounded by:

$$S_k(r) = \frac{T-N}{k} + N - 1 + (N-1)r$$

Hence, r should be minimized for storage and maximized for speed.

Ternary Hybrid Search Tree

The trie node of a binary hybrid tree is merged with the parent tree node of the binary hybrid tree to form a ternary tree node. FIG. 4 is a ternary hybrid search tree for the two IP addresses 110 and 100. Each node in the tree has 3 pointers and there are no trie nodes. Each node holds a stride+1 character. If the incoming stride+1 character matches with the current node, then the middle pointer, representing a successful search is traversed. Otherwise, if the current bit is on, then the left pointer is traversed. If the current bit is zero, then the right pointer is traversed. The current bit in this case is the most significant bit of the incoming stride+1 character. If this bit is a 1 the left (1) transition is followed to the next level of the tree and the bit is a 0 the right (0) transition is followed to the next level of the tree. The advantage of the ternary hybrid search tree is in saving the trie node of the hybrid search tree. Although each tree node has three pointers instead of two, the total number of nodes to represent the same set of keywords as the binary hybrid search tree may be less.

Spstring is also used to represent ternary hybrid search trees. The (middle) pointer representing a match with the stride+1 character of the current tree node is implicitly represented by adjacent positions in the spstring where position i represent the current tree node c and position i+1 represents the tree node, which is the child node of c after following the match or middle pointer of c. The skip pointer at position i is the sibling pointer of the tree node c. For example, the spstring representation of the ternary hybrid search tree in FIG. 4 is:

s=(d, 3).e.a.f.

The worst-case search time is 3|P|+3 traversals and this turns out to be the same as the spstring representation of the binary hybrid search tree with r=1.

The ternary hybrid search tree has the following data structure:

```
Struct TreeNode begin
    Character StrideChar;
    Integer hop; {Nexthop adr idx}
    Integer len; {Len of StrideChar}
    Pointer PrefixPtr;
    Pointer ZeroPtr;
    Pointer OnePtr;
End
```

The difference between the TreeNode data structure and the earlier BTreeNode data structure is the addition of the pointer PrefixPtr. The variable hop stores the next-hop address of an IP address that reaches the current node. If the delimiter bit of the stride+1 character is on the next-hop address is stored in PrefixPtr. There should not be any child nodes via PrefixPtr for that tree node.

The following Algorithm finds the longest prefix match in the ternary hybrid search tree for the input string P.

```
Method: Search_THT
Input: string P, integer k
Output: stack t, integer h, integer w
1:      integer i ← 0; {Initialization}
2:      integer hop ← 0;
3:      TreeNode c ← root;
4:      stack o ← NULL;
5:      while c ≠ NULL do {Loop}
6:          push(c, o); {For delete only}
7:          hop ← c.hop; {Keep track of hop}
8:          if c.StrideChar = P[i..i+k−1] then
9:              i ← i + c.len;
10:             if c.len < k then {exact match}
11:                 return (o, c.PrefixPtr, 0);
12:             else c ← c.PrefixPtr;
13:         elseif P[i] = 0 then
14:             c ← c.ZeroPtr;
15:             i ← i + 1;
16:         elseif P[i] = 1 then
17:             c ← c.OnePtr;
18:             i ← i + 1;
19:         else {end}
20:             return (o, hop,|P|+1); {exact match}
21:     return (o, hop, i); (prefix match}
```

The search begins with the root node (Step 4) and repeatedly tries to find the appropriate child node of the current node to traverse. Before the traversal, some housekeeping tasks are carried out (Steps 6 and 7), including maintaining the stack of traversed nodes, and updating the next-hop address index of the longest prefix matched. Step 8 tests whether the stride+1 character matches the input string P at position i. If there is a match, the child node corresponding to a successful stride+1 character matching is traversed via PrefixPtr. The string position i is updated by the length of the stride+1 character, which is stored in c.len. If c.len<k, then the delimiter bit of the stride+1 character is on and the search ends in success. In this case (Step 11), the stack of the traversed nodes, the next-hop address index stored in c.PrefixPtr and the match flag are returned. If the match flag is zero, then the match is an exact match. If the match flag is |P|+1, then it is also an exact match but the next-hop address index is stored in the hop variable, instead of the PrefixPtr. Otherwise, it is a prefix match.

If the stride+1 character does not match with the input string P at position i, then Search_TNT examines whether P[i] is zero (step 13). If this is true, then the c.ZeroPtr is traversed and the string position i is advanced by unity. Likewise, if P[i]=1, then c.OnePtr is traversed and i is incremented. Otherwise, the end of the input string P is reached. In this case, the stack, next-hop address index and the successful match flag are returned (Step 20).

The following Algorithm inserts one IP address into the ternary hybrid search tree.

```
Method: Insert_THT
Input: string P, integer k, integer h
Output: NULL
1:      integer i;
2:      integer hop;
3:      stack t;
4:      (t, hop, i) ← Search_THT(P, k);
5:      TreeNode c ← pop(t);
6:      if i = 0 or i = |P| + 1 then
7:          if i = 0 then c.PrefixPtr ← h;
8:          else c.hop ← h;
9:          return;
10:     TreeNode o ← CreateNode( );
11:     if c = NULL then root ← o;
12:     elseif c.PrefixPtr ≠ NULL then
13:         if P[i] = 0 then c.ZeroPtr ← o;
14:         else c.OnePtr ← o;
15:         i ← i + 1;
16:     else c.PrefixPtr ← o;
17:     while i + k ≦ |P| do
18:         o.StrideChar ← MakeChar(P, i);
19:         o.len ← k;
20:         o.hop ← h; {longest match}
21:         o.PrefixPtr ← CreateNode( );
22:         o ← o.PrefixPtr;
23:     o.StrideChar ← MakeChar(P, i);
24:     o.len ← i + k − |P|;
25:     o.PrefixPtr ← h;
```

Initially, Search_THT( ) is called to determine whether the IP address exist in the ternary hybrid search tree. If there is exactly the same IP address in the ternary hybrid search tree, then the next-hop address index is updated (Steps 7 and 8). Otherwise, a prefix match is found and a node is created (Step 10). If the current node c is null, then the ternary hybrid search tree must have been the empty tree or null. Hence, the root node is updated (Step 11). If the current node has a non-null prefix pointer, then either the OnePtr or the ZeroPtr of the current node is null and needs to be updated (Steps 13 to 15). Since the traversal of the pointer to the child node consumes one bit of the IP address, i is incremented (Step 15). Otherwise, the PrefixPtr is updated (Step 16). Steps 17 to 22 repeatedly append a stride+1 character to the node o. Steps 23 to 25 add a stride+1 character to the last node. It is assumed that CreateNode(.) will initial the pointers of the new node to null and MakeChar(.) will automatically create a stride+1 character based on k or less than k bits in the IP address.

The following Algorithm deletes one IP address from the ternary hybrid search tree.

```
Method: Delete_THT
Input: string P, integer k
Output: NULL
1:      integer i;
2:      integer hop;
3:      stack t;
4:      TreeNode o;
5:      (t, hop, i) ← Search_THT(P, k);
6:      TreeNode c ← pop(t);
7:      integer phop ← PreviousHop(t);
8:      if i = |P| + 1 or I = |P| + 1 then
9:          if not leave(c) then c.hop ← phop;
10:         else
11:             while c ≠ NULL and
                     c.ZeroPtr = NULL and
                     c.OnePtr = NULL and
                     c.hop = hop do
12:                 o ← c;
13:                 FreeNode(c);
14:                 c ← pop(t);
15:             if c.ZeroPtr = o then
16:                 c.ZeroPtr ← NULL;
17:             else if c.OnePtr = o then
18:                 c.OnePtr ← NULL;
19:             else c.PrefixPtr ← NULL;
```

Firstly, the IP address to be deleted must be found in the ternary hybrid search tree (see Step 5). If it is found and the node is not a leave node, then only the hop address indexes are updated (Step 8 and 9) and the current node c is not deleted. Otherwise, backtracking of the ternary hybrid search tree is implemented as popping the stack t, until the node has a non-null ZeroPtr or a non-null OnePtr or the next-hop address index is not the same as the next-hop address index of the deleted IP address. Finally (Step 15-19), the child pointer of the undeleted node is reset to NULL.

Path Packing in Pointers

Figure 5:
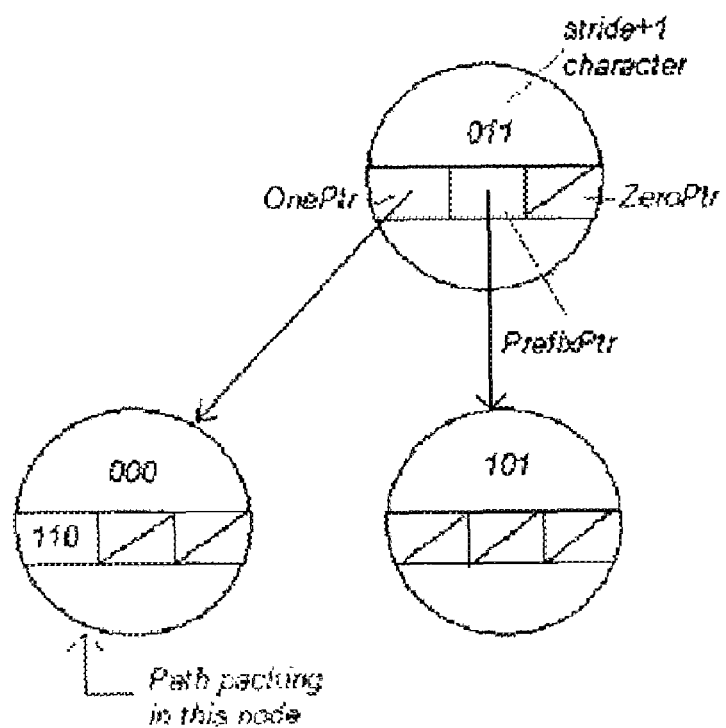
FIG. 5 illustrates path packing for the ternary hybrid search tree in FIG. 5.

FIG. 5 shows the path packed ternary hybrid search tree of FIG. 4. In path packing, a sequence of nodes of out-degree is stored as a string in unused pointers of a node. For example, the packed bits of a leaf node are stored in the pointer field of its parent node instead of the pointer to the leaf node. In FIG. 5 path packing is used in the bottom right node, where the path is stored in the OnePtr of the node. For stride+1 character, the prefix bit can be used to indicate the last character of the path. Path packing is a general technique that can be used for any (sparse) tree structure.

Two type of path packing are used. If the path to be packed requires storage of more than two pointers plus a stride+1 character, then the PrefixPtr can be used to store a pointer pointing to the next node, and the stride+1 character, OnePtr and ZeroPtr of the node are used to store the path. Alternatively, the path can be stored in a single node using the stride+1 character, PrefixPtr, ZeroPtr and OnePtr.

The variable len of a node can be used to indicate whether there is any path packing and if there so, what type of path packing is used. Following Algorithm is an example.

---

If $0 < \text{len} \leq k$ then no path packing
Else if $\text{len} \leq k + 2 \, C_p / C_c$ then
   the string is packed in the stride+1 character,
the OnePtr and the ZeroPtr of the current
node
Else the string is packed in the stride+1 character,
the PrefixPtr, the OnePtr and the ZeroPtr
of the current node
where $C_p$ is the storage cost of a pointer and
$C_c$ is the storage cost of a character.

---

Hardware Design

In the first subsection, the basic IP forwarding machine that implements the search and update algorithms using spstring or hybrid search tree ADT is discussed. Only selected components of the basic forwarding machine are discussed to highlight the implementation problems and to demonstrate how simple the machines are.

Basic Forwarding Machine

The search and update algorithms for the spstring and trie data structures are implemented using finite state machines (FSMs). The processing of FSMs can be divided into three general stages where pipeline techniques can reduce the total number of clock cycles further. The first stage is to load the data and perform some pre-processing (e.g. length calculation). In the second stage searching or updating based on the spstring or trie data structure is carried out. The final stage is to determine the next-hop address for output. The FSMs are also designed to change state on the negative edge of the clock and to process the combination logic on the positive edge of the clock to reduce unwanted transient effect.

Figure 6:
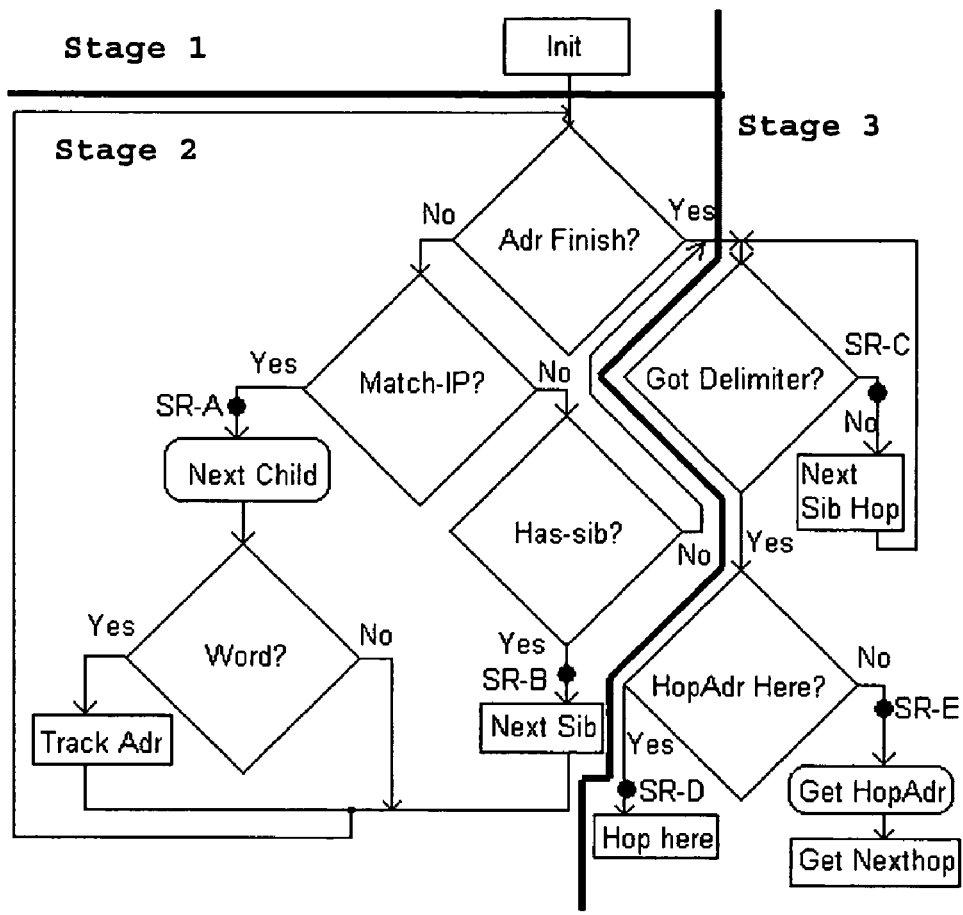
FIG. 6 is an Algorithmic State Machine (ASM) Chart for a search process.

FIG. 6 shows the Algorithmic State Machine (ASM) chart of the search process for the spstring data structure for a binary alphabet. In total, there are only 6 states, illustrating that a very simple FSM can be built with very little circuitry added to the SRAM. The control signals are SR-A, SR-B, etc. This ASM chart serves as the basic structure for searching whether stride+1 coding or hybrid search trees are used.

The search process is divided into three stages which can be pipelined. Stage 1 (Init) loads the IP address and its length. Stage 2 is the Spstring search. If the current address is completely matched (Adr Finish) then the search moves to stage 3. Otherwise, the ASM will examine whether the current stride character matches (Match-IP), signalling the Match-IP flag. If there is a match (i.e., SR-A is true), then the next child is obtained by incrementing the memory address for Spstring. If the prefix bit is on or prefix character is found, the Word flag is set and the current hop address is stored at the Track Adr state. If the Match-IP is zero and the skip pointer value is non zero (i.e., not NULL), then the sibling node is visited by loading the skip pointer value of the Spstring into the address decoder. In this case, if the delimiter bit is on or the word flag is on, then the next hop address is updated (during the next sib state). Otherwise if the skip pointer value is null, then searching is finished and stage 3 begins. In stage 3, the prefix character is sought, until it is found or until the skip pointer value is zero (i.e., NULL). If the prefix is found, then the hop address has to be loaded into the hop register during the load hop state. If the skip pointer value is zero, then the content of the hop register is the most updated. Finally, in the hop here state, the content of the hop register is used as the next-hop address index in order to lookup the specific next-hop address for forwarding.

Figure 7:
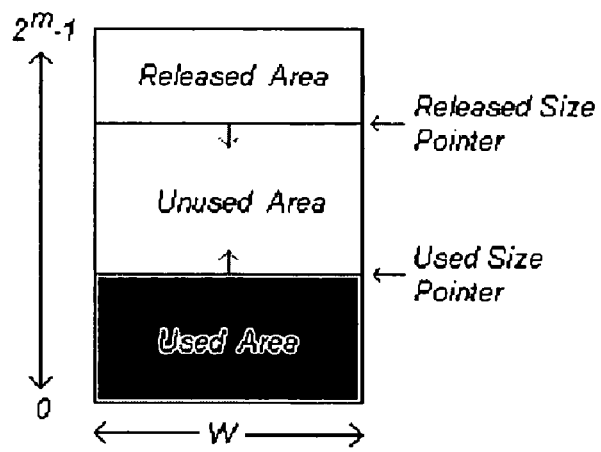
FIG. 7 illustrates memory organization.

FIG. 7 illustrates the organisation of the Static Random Access Memory (SRAM). The SRAM is organized into a used area, an unused area and a released area. The used area is memory that is currently used by spstring or the tries. It may contain some freed memory. The unused area is the memory region that is not used for any purpose. The released area is the memory region that stores information about memory that is freed dynamically. The freed memory may be in the used or unused areas.

Each location in the unused or released area contains a pointer and a block size. The pointer points to the area where the memory is free in the used area and the block size indicates the contiguous memory that is free starting from the pointer location to the pointer location plus the block size. If the block size is zero, then that addressable space is in the unused area. The size of the pointer is m and the block size is W−m, where W is the memory width. The released area can be organized into a heap if the storage allocation is based on the largest block of memory.

Initially, when the power is turned on, the size of the release and used areas is zero and the entire memory space is the unused area. Hence, the used size pointer is 0 and the released size pointer is $2^m-1$. Memory is allocated using the SRAM_Block_Alloc Algorithm.

---

Method: SRAM_Block_Alloc
Input: integer m, integer b
Output: integer adr
1:    integer adr1 ← FindBestBlock(RPtr, b);
2:    if RPtr = $2^m$ − 1 OR adr1 = −1
3:       if Uptr + b ≤ RPtr
4:          adr ← UPtr;
5:          Uptr ← Uptr + b;
6:       else return −1; {No free memory}
7:    else
8:       if adr1 ≥ 0
9:          adr ← SRAM[adr1].Pointer;
10:      if SRAM[adr1].BlockSize > b
11:         SRAM[adr1].BlockSize ←
                SRAM[adr1].BlockSize − b;
12:         SRAM[adr1].Pointer ←
                SRAM[adr1].Pointer + b;
13:         SortReleasedArea(RPtr);
14:      else
15:         RemoveBlock(RPtr, adr);

-continued

```
16:        RPtr ← RPtr + 1;
17:    return adr;
```

The released area is checked to see if a large enough or best-fit contiguous block is available. FindBestBlock(RPtr, b) returns the address of the best matched size block released RAM. If the returned value is minus one, then no blocks of the released RAM are at least as large as the required block size b. This is always the case if the released area has no memory (i.e., RPtr=$2^m$−1). If there were no deletions, then memory in the unused area is used and the used size pointer is updated (Steps 4 and 5).

This simple memory organization can lead to memory fragmentation for spstring since large enough contiguous blocks of memory may not be available even though some smaller free memory blocks are available. The spstring is rebuilt if the returned value is minus one (Step 6). Since spstring are designed for static solutions and dynamic with insertion solutions, deletions are expected to be seldom and rebuilding the spstring from scratch would be infrequent. For fast insertion, FindBestBlock(RPtr, b) returns minus one if there is sufficient memory in the unused area for insertion. If the unused area is not large enough, the released area is used and the memory allocation speed would be much slower since the time complexity of SortReleasedArea(RPtr) and RemoveBlock(RPtr, adr) may be linear with respect to the size of the released area.

If there is a memory de-allocation, then an extra location in memory is used to point to the block of de-allocated memory. If there is any memory in the released area that is adjacent to the de-allocated memory to form a large contiguous block of released memory, then it is sufficient to update the block size of the adjacent block of memory in the released area.

The memory allocation and de-allocation even for our simple machine is quite complicated. A simpler solution is to allow for insertions and allow for deletions but without memory de-allocation. When the memory is not enough, the spstring is rebuilt completely. However, this simple scheme requires additional storage to hold the address during the rebuilt process. With a Multiple Instruction Multiple Data (MIMED) architecture with multiple machines, one machine could be used to rebuild the spstring for the other machine. Unfortunately, two machines would be used for rebuilding the spstring instead of one.

The memory organization for tries is much simpler because there is no requirement a block of contiguous memory. This memory organization does not have any memory fragmentation problem if each addressable space can hold one trie node. Since there is no need to find the best match block of memory, memory allocation and de-allocation can be performed efficiently (i.e. in one clock cycle).

When the system is powered on, the memory is organized into a linked list of records of free space. The following SRAM_Trie_Init Algorithm achieves this.

```
Method: SRAM_Trie_Init
Input: integer m
Output: Nil
1:   for integer i ← 0 to $2^m$−1 do
2:       if I = 2m − 1 {Last Free Memory}
3:           SRAM[i].Pointer ← −1;
4:           SRAM[i].BlockSize ← 1;
5:       else
6:           SRAM[i].Pointer ← i + 1;
7:           SRAM[i].BlockSize ← 1;
8:   RPtr ← 0; {Free space from address 0}
```

Each record is associated with a unique address in memory and it has a pointer that points to the next location where free memory is available. When the system is initialized, the pointer points to the current location plus one (Step 6 and 7). When the end of memory is encountered (Step 2) the pointer is assigned the value minus one to indicate that the end of the linked list or stack is encountered with no more free memory available. This initialization is algorithmically simple but it requires $2^m$+1 clock cycles to initialize.

An alternative method uses an additional pointer, say UPtr (or the UsedSize pointer) to indicate where the memory is used up to. Initially, the UPtr is initialized to zero and RPtr to minus one. This only requires two clock cycles for initialization (c.f. $2^m$+1 clock cycles for the previous method). When allocating memory for a trie node only one address is returned. The following SRAM_Trie_Alloc Algorithm is used to allocate memory a trie node.

```
Method: SRAM_Trie_Alloc
Input: integer m
Output: integer adr
1:    if RPtr < 0 {No Released RAM}
2:        if Uptr = $2^m$ − 1
3:            adr ← −1; {No memory}
4:        else
5:            adr ← UPtr;
6:            UPtr ← UPtr + 1;
7:    else
8:        adr ← RPtr;
9:        RPtr ← SRAM[RPtr].Pointer;
10:   return adr;
```

If there is any freed memory (i.e., RPtr≧0) then freed memory is allocated (Steps 8 and 9). If there is unused memory (i.e. UPtr<$2^m$−1) then this unused memory is used (Steps 5 and 6). If there is neither freed memory nor any unused memory, then an error value −1 is returned (Step 3). Since there is no freed memory after initialization the unused memory is used since RPtr is initialized to minus one.

Memory de-allocation is simpler than memory allocation. The following SRAM_Trie_Free Algorithm is used to de-allocate memory from trie node.

```
Method: SRAM_Trie_Free (FreeNode)
Input: integer adr
Output: Null
1:   SRAM[adr].Pointer ← RPtr;
2:   SRAM[adr].BlockSize ← 1;
3:   RPtr ← adr;
```

The freed trie node is simply pushed into the stack of freed memory, updating the top of the stack pointer (i.e. RPtr). The amount of available space for the stack of freed memory is limited by the used memory space. Since the amount of freed memory can never be larger than the used memory, there is no need to consider the use of unused memory to maintain the stack of freed memory (i.e., no need to update UPtr).

Clearly, memory initialization, allocation and de-allocation are very efficient to carry out, which requires only one or two clock cycle(s).

The width W of the SRAM memory depends on a number of factors. Firstly, k bits are reserved for stride+1 coding and 1 bit for maintaining the next-hop address. Secondly, an spstring has one pointer and a trie node has two pointers. The pointer size of m bits depends on the addressable space, which in turn depends on the maximum number of IP addresses that needs to be stored. If 256K IP addresses are stored m is at least 18 bits. Further, if every IP address requires 4 address spaces then m should be set to 20 bits. Thirdly, the next-hop address index can be stored in every address space or it can be stored after the delimiter character or after the character where the delimiter bit is on, in which case it occupies an address space. Storing the next-hop address index in every addressable space is preferred if the size h of the next-hop address index is relatively small. In general, this method is used when $$h \le \frac{NW}{2^m}$$

where N is the maximum number of IP addresses. Even if the above becomes an equality it is preferable to assign the next-hop address index to every addressable space because it can reduce the usage of address space and because the next-hop address index can be loaded in parallel with the other information (e.g. pointer and stride+1 character), saving an additional clock.

If N=256K, h=8 and m=20 then the next-hop address index is assigned to every address space when W≧32 bits. W>32 bits for every trie node because it has 2 pointers (i.e. 2×20 bits). Hence, each trie node should store a next-hop address index. For spstring the memory width W is k+1+ml. The next-hop address index is assigned to each addressable space if k>W−m−1.

Figure 8:
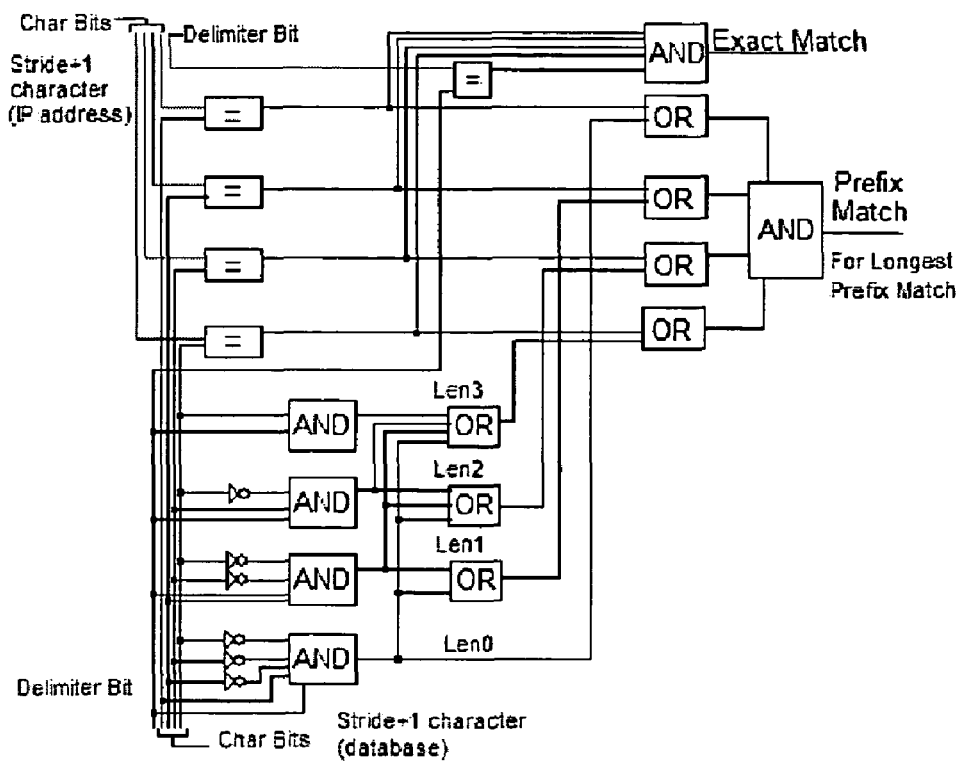
FIG. 8 illustrates Combinational logic for parallel matching between two characters.

When stride+1 coding is used the Match-IP decision is implemented based on parallel comparison logic. For stride k, k bits from the IP address prefix are compared with the k bits in memory. In addition, the delimiter bit is placed at the back (least significant bit) of the IP address prefix and the delimiter bit is placed at the front (the most significant bit), which have to be processed as well. There are two outputs from the comparison: the exact match and the prefix match. The exact match requires the bit patterns between the stride+1 character of the IP address prefix and the character in memory to match exactly. The prefix match is the same as the exact match when the delimiter bit is zero. Otherwise, when the delimiter bit is one a match is found if the prefix of stride+1 character in memory is matched with the stride+1 character of the IP address. This prefix match is used for keep track of the next-hop address for the longest prefix match. FIG. 8 shows parallel comparison logic for the stride k=4.

Hardware implementation of the Hybrid Search Tree

The ASM chart corresponding to the Search_THT Algorithm for the ternary hybrid search tree comprises only two states: state one for initialisation, which corresponds to Step 1 to 4 of the Search_THT Algorithm; and state two for looping, which corresponds to Step 5 to 21 of the Search_THT.

Figure 9:
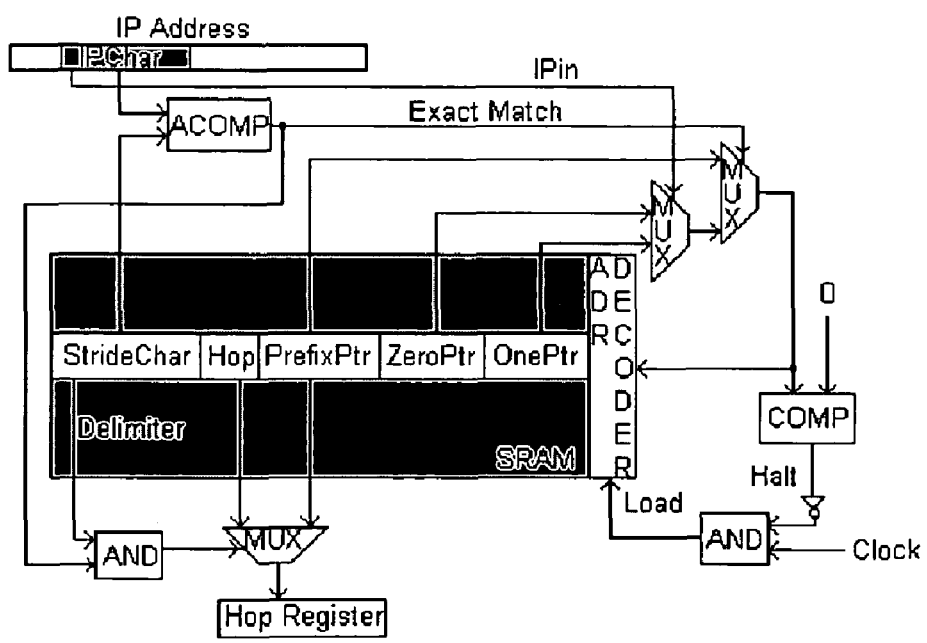
FIG. 9 illustrates Hardware implementation of a ternary hybrid search tree.

FIG. 9 shows the hardware implementation of the Search_THT Algorithm, assuming that the values in the registers are appropriately initialized after state one.

The hardware compares packing multiple bits (called IPChar) from the IP address with the StrideChar in the memory. The result of the comparison indicates whether there is an exact match. If there is an exact match the value of the prefix pointer (PrefixPtr) is the next address and the current IP address position is moved by one stride k. Otherwise, the current IP address position is advanced by one position. Also, the next address depends on whether the current bit of the IP address is a zero or a one, where the value of the ZeroPtr or the OnePtr would be routed to the next address, respectively. The memory lookup terminates when the next address is zero (Step 5 in search_TNT). The index of the next-hop address is stored in the hop register, which is updated either by the hop field of the accessed memory or the PrefixPtr field of the accessed memory, depending on whether the delimiter bit of the StrideChar is on and whether the end of the IP address is reached.

The procedure for inserting an IP address into the ternary hybrid search tree is more complicated. The state transitions and the associated actions of the ASM chart for the Insert_TNT Algorithm are shown in Table 1.

The update starts with state zero. The transition from state zero to state one will initiate the search logic, FIG. 9, and initialize different variables for Insert_THT. The transition from state one to itself is simply a polling mechanism to wait for the search logic to halt.

The state transitions and the associated actions of the ASM chart for the Delete_TNT Algorithm are shown in Table 2. The deletion procedure needs to searches to check whether the IP address is in the ternary hybrid search tree. If it is not the delete operation stops immediately (state 1 to state 3 transition). Otherwise, the previous next-hop address is stored in the last node of the search traversal (state 1 to 2 transition). Next, the current last node of the search traversal is deleted (state 2 self-transition) until the current last node is the root node, or has a non-null ZeroPtr or non-null OnePtr or has a different next-hop address value.

Level Folding

Level compression has been applied in LC-tries and in hardware for IP forwarding to speed up the search process. However, if level compression is applied to different trie nodes as well as the root node memory management becomes complex. For this reason level compression is only applied at the root node. In addition, instead of enumerating all the levels from 0 to d, as in level compression, contiguous memory is only allocated for certain levels, e.g. level $d_1$ and level $d_2$ only. This can save half the storage cost for each level and it serves the purpose of bounding the search time to $d_1$ and $d_2-d_1$ (assuming that $d_2>d_1$). This modified technique is called level folding to distinguish it from level compression. Another advantage of the level folding technique is that update is simplified because there is no need to expand prefixes. Instead only the highest level is identified for update.

Each entry at a particular level d in level folding corresponds to an IP address prefix bit pattern of length d. In this way, there is no need to implement any matching logic. Instead, the first d bits of the IP address are used as a memory address to lookup information relating to the entry. Each entry contains a pointer to the memory where the search or update process begins and a next-hop address index for the first d-bits matched. Assuming that the next-hop address index needs 8 bits and the pointer needs 20 bits, each entry requires 28 bits to store information.

Due to the concentration of IP addresses of length 8, 16 and 24 d, is set to 8 and $d_2$ is set to 16 for the hardware design. IP addresses of length 24 are too large to be accommodated in the chip, which originally only holds 32 Mbytes of RAM. Specifically, 24 bits implies 16 million address spaces.

Assuming each entry needs 28 bits, the total storage needed is 56 Mbytes. Even if each entry contains only the next-hop address index, the level folding technique would consume 16 Mbytes, with 16 Mbytes left for the other machines. This implies about half of the number of individual forwarding machines can be accommodated and the search speed would be halved.

Instead of enumerating all the d-bit patterns of the $d^{th}$ level folding, which requires $2^d$ address space, only the most commonly used d-bits IP address prefixes are stored and used in a binary content addressable memory (CAM) cache. This is dynamic level folding, as compared to the previous static level folding. It is effective in two respects. Firstly, caching the IP addresses in the database is more effective than caching the incoming IP addresses. And secondly, using a standard binary CAM to cache IP address prefixes of fixed length d enables caching of a group of IP addresses that share the same prefix of length d, reducing the likelihood of a miss even though the incoming IP addresses may differ as long as the address prefix has the same initial d bits. The use of a binary CAM also saves half the number of memory cells and reduces gate counts for comparison for each entry. The net effect is that a larger size binary CAM can be used, increasing the likelihood of a cache hit, or alternatively more levels of dynamic level folding can be supported.

As levels become higher and higher, the number of IP addresses of longer length becomes less and less, and the required cache size can be reduced further and further. Dynamic level folding at level 20, 24 and 28 can be implemented using a 1k binary CAM for each level. When the cache is empty and an IP address of length d or longer is inserted the CAM for the dynamic level folding at the $d^{th}$ level is updated. Hence, if the number of IP addresses of length larger than or equal to d is less than the size of the CAM dynamic level folding is emulating static level folding. This is because all IP addresses of length d or longer are stored in the CAM. For very long IP addresses this mode of operation is the norm rather than exception as the number of long IP addresses is small. If there is more than 1 level of dynamic level folding the deepest level that is shorter than or equal to the length of the inserted IP address is updated.

The number of bits in a cache line is the number m of bits for memory addresses plus the number h of bits of the next-hop address index (i.e. m+h). Typically, d is at most 32 for IP version 4 (IPv4) addresses, m is 20 and h is 8. Thus, the cache line for IPv4 addresses is just 28 bits, with at least 16 tag bits and at most 32 tag bits.

Pipeline Architecture

The pipeline/cascade architecture enables simple algorithms to operate at 1 clock cycle per IP address lookup in a uniform manner. It is also scalable to longer prefixes by cascading more stages without affecting the throughput. However, not every search algorithm can be put into pipeline or cascade architecture and two additional problems need to be resolved. The first problem is the amount of memory to allocate at each stage of the pipeline and the second problem is the priority to output the results.

Figure 10:
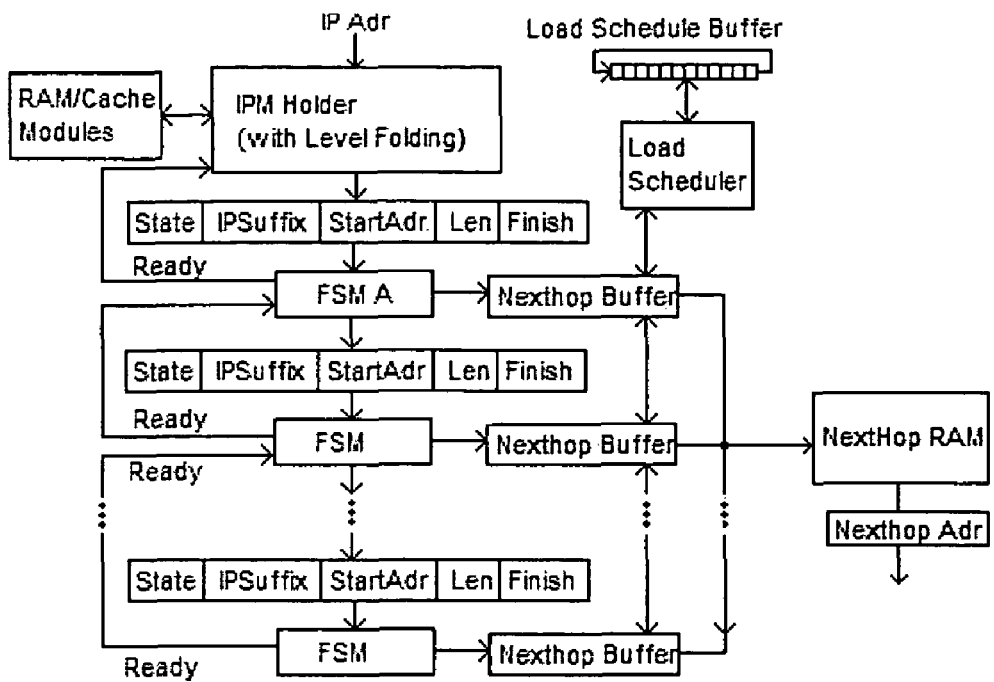
FIG. 10 illustrates Cascade architecture.

FIG. 10 shows the cascade (or asynchronous pipeline) architecture for IP forwarding based on the FSM design. The IPM Holder module has a buffer that stores the incoming IP address and the (dynamic or static) level folding is executed in this module. The IPM holder partitions the incoming IP address into IP suffix the retrieves the address (start address) of the root node at which the FSM is to start the search. For each stage of the cascade the state of processing is passed to the next stage, with the unprocessed IP suffix, the next node address (called StartAdr) in the next FSM module and the remaining length of the IP address.

A potential problem with cascade architecture arises in passing this amount of information from one stage to the other. For IPv4, IPSuffix length can be as long as 32 bits, requiring 5 bits for the length information. If the address space is specified in 20 bits and 6 bits are used to represent different states, the total number of bits is 63 bits. For IP version 6 (Ipv6) the number of bits to pass from one stage to the next is 162 bits. It is unlikely that such a large internal bus is used inside a chip. If several chips are placed in a cascade, then 162 pins are needed if the data is transferred in one external clock. For each FSM, there is a buffer to hold the next-hop address index. Assuming that the next-hop buffer can pass the next-hop address index in parallel with a 32 bit bus, it is possible to off load 4 next-hop address index simultaneously if each next-hop address index needs 8 bits.

For trie based solutions, if each stage corresponds to the depth of the trie data structure then by the prefix property there are at most N trie nodes if the chip can hold at most N IP addresses. Furthermore, if the root trie node is at depth 0 the number of trie nodes is limited by the depth d to $2^d$. Hence, at any stage d, the number $T_d$ of trie nodes is bounded as follows:

$$T_d \leq \min\{2^d, N\}$$

For a standard binary trie, assuming that N=256K, each trie node has 2 pointers plus the next-hop address index. Assuming that each pointer uses 18 bits and the next-hop address index uses 8 bits, a trie node needs 44 bits, which can easily be contained within 6 bytes. From stage 0 to stage 17, the total number of nodes is:

$$1+2+4+\ldots+128k=256k$$

Hence, the storage from stage 0 to 17 is 256K×6 bytes=1.5 M bytes. Thereafter, each stage needs to maintain 1.5 Mbytes. For a 32 Mbyte SRAM the total number of stages that can be stored is 21 and the maximum length of the IP address represented in the pipeline is 37 bits (i.e. 17+20). For IPv4 a single chip can accommodate 256K IP addresses. For IPv6 additional chips are necessary. If a chip holds 32 Mbytes another 5 chips are necessary for IP addresses of length 128 bits.

Apart from memory allocation, the other problem with cascade architecture is the priority to output results when there is more than one stage of the pipeline that has the next-hop address index. To overcome this the next-hop address is output only at the end of the pipeline. This means that the order of the incoming packets is the same as the order of the out-going packets.

Multiple Instruction Multiple Data Architecture

Figure 11:
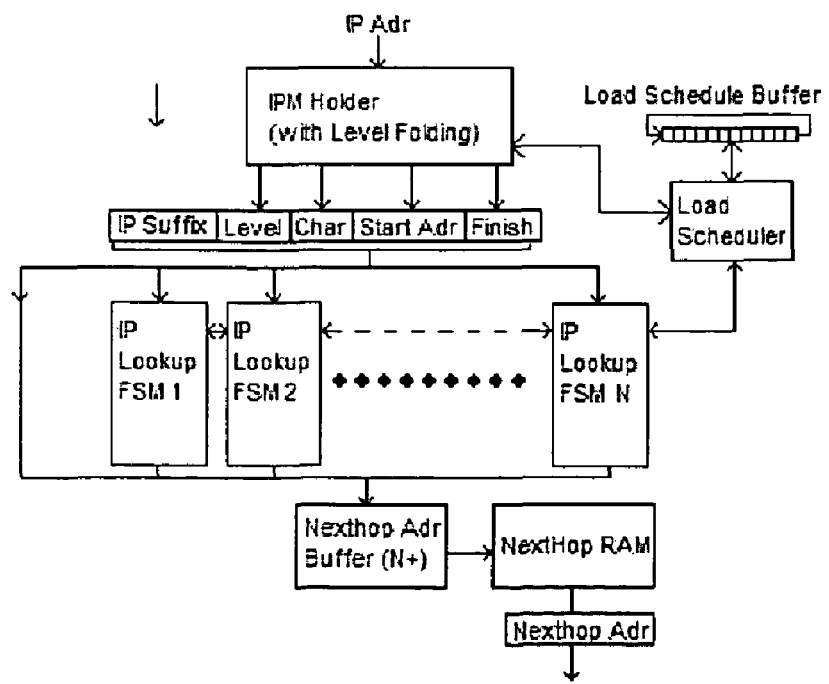
FIG. 11 illustrates MIMD architecture, Table 1 is an ASM Chart for inserting a single IP address into an existing ternary hybrid search tree, and Table 2 is an ASM Chart for deleting a single IP address in the ternary hybrid search tree.

FIG. 11 shows a generic MIMD architecture for IP forwarding based on the FSM design. It is possible for MIMD architecture to achieve an IP lookup average of less than one clock cycle. The IPM Holder is involved in loading and holding the IP addresses. In addition, once the IP address is loaded, level folding is applied to determine the start address of the IP lookup FSM. Since level folding is carried out in one clock cycle it can be used within a pipeline to sharing level folding between different forwarding machines, which saves storage space.

A problem with MIMD architecture is whether loading of each forwarding machines can be scheduled effectively. A simple mechanism using a ring buffer for holding the identifiers of idle forwarding machines is used. A pointer keeps track of the front of the queue stored in the ring buffer and another pointer keeps track of the back of the queue. Whenever a forwarding machine is assigned to the current packet the (front) pointer is advanced to the next position in the ring buffer.

If the end of the buffer is encountered the next position is the zeroth position of the ring buffer. If a forwarding machine has completed a task the (back) pointer adds the identifier of the new idle forwarding machine at the back of the queue and the pointer is moved backward by one position. If the pointer reached the zeroth position of the buffer the pointer is set to the end of the buffer.

When the front and back pointers are pointing at the same location all forwarding machines are in operation and incoming packets have to wait before processing can begin. The size of the ring buffer is the same as the number of forwarding machines that can be packed in a chip since the total number of idling forwarding machines is the total number of available machines in a chip.

When two more or more forwarding machine are idled simultaneously and their identifiers need to be placed in the ring buffer, a conflict as to which machine should be placed first. Since each forwarding machine can forward identical packets at the same rate, only serialization of the queue up process is needed since there are no priorities to determine which idle forwarding machine to choose.

Another issue with MIMD architecture is whether the forwarding machines can be updated simultaneously. If not, the worst-case update time can be increased by a multiplicative factor of the number of forwarding machines in a chip. One solution to this problem is to update asynchronously but by means of scheduling. The updated forwarding machines are used for searching and the not updated machines are simultaneously and asynchronously updated. The drawback of this solution is that it reduces the number of available forwarding machines during update of the database and therefore reduces the forwarding rate during updates.

Another solution is to suspend the current forwarding operation of all machines while the update if completed. For insertions and modifications, all forwarding machines synchronously update the database. For deletions, synchronous update is more complicated.

Where in the foregoing description reference has been made to integers or elements have known equivalents then such are included as if individually set forth herein.

Embodiments of the invention have been described, however it is understood that variations, improvement or modifications can take place without departure from the spirit of the invention.

What is claimed is:

1. An article of manufacture, comprising:
   a tangible computer-readable data storage medium; and
   instructions stored in the computer-readable data storage medium, wherein when the instructions are executed by a computing device, the instructions cause the computing device to search a data structure as part of routing IP packets;
   wherein the data structure comprises a linearized representation of a tree of two or more searchable strings of IP address prefix data, wherein each string is divided into a plurality of substrings, and wherein the tree comprises a plurality of nodes including first-type nodes configured to store corresponding associated searchable substrings and second-type nodes not configured to store corresponding associated searchable substrings; and
   wherein the data structure comprises match-failed transition information configured to link to a second-type node from a first-type node and prefix bit transition information configured to link to a first-type node from a second-type node based on a next bit from an IP address for which the data structure is being searched.

2. The article of claim 1, wherein the first-type nodes each comprise a first field storing the associated searchable substring and a second field storing match-failed transition information.

3. The article of claim 2, wherein the first field comprises a predetermined number of elements configured to store both the searchable substring and a prefix value indicating whether the searchable substring comprises an end of a string.

4. The article of claim 3, wherein the elements are binary bits and the prefix value is a single bit comprising 0 or 1.

5. The article of claim 3, wherein the first field corresponds to an abstract coding character.

6. The article of claim 1, wherein the second-type node comprises both a first field comprising a NULL value and a second field storing prefix bit transition information.

7. A method for routing IP packets, the method comprising:
   storing, by a computing device, a tree of IP address prefixes in a computer-readable storage medium using a linearized data structure that represents the tree, wherein the tree has at least two levels of nodes, including:
      a first-level node having a first field for storing an abstract coding character that represents a substring of an IP address prefix; and
      at least two second-level nodes linked to the first-level node via a match transition and a match-failed transition, respectively;
      wherein the second-level node which is linked to the first-level node via the match-failed transition does not store an abstract coding character and is linked to a third-level node via a prefix transition; and
   searching, by the computing device, the data structure to route an IP packet having a destination IP address, wherein said searching includes:
      comparing a substring of the destination IP address to the substring of the abstract coding character stored in the first field of the first-level node;
      transitioning to the corresponding linked one of the second-level nodes depending on whether said comparing a substring of the destination IP address results in a match or a match failed; and
      transitioning to the third-level node by comparing a first bit from the destination IP address to a bit corresponding to the prefix transition.

8. The method of claim 7, wherein the first-level node comprises both a first field storing the abstract coding character having the associated substring and a second field storing match-failed transition information.

9. The method of claim 8, wherein the first field comprises a predetermined number of elements configured to store both the substring and a prefix value indicating whether the substring comprises an end of a string.

10. The method of claim 9, wherein the elements are binary bits and the prefix value is a single bit comprising 0 or 1.

11. The article of claim 1, wherein the second-type node comprises both a first field comprising a NULL value and a second field storing prefix transition information.

12. The method of claim 7, wherein:
   the computing device is a router, and wherein
   the method further comprises:
      using, by the router, information in the data structure to identify an exit port on the router to route the IP packet; and
      routing, by the router, the data packet to the exit port.

* * * * *